United States Patent
Tanaka et al.

(10) Patent No.: US 7,523,287 B2
(45) Date of Patent: Apr. 21, 2009

(54) STORAGE SYSTEM AND METHOD FOR RESTRICTING ACCESS TO VIRTUAL MEMORY AREA BY MANAGEMENT HOST, AND PROGRAM FOR EXECUTING THE SAME

(75) Inventors: Toru Tanaka, Kawasaki (JP); Masayuki Yamamoto, Sagamihara (JP); Yuichi Taguchi, Sagamihara (JP); Yasunori Kaneda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 308 days.

(21) Appl. No.: 11/447,075

(22) Filed: Jun. 6, 2006

(65) Prior Publication Data
US 2007/0233983 A1 Oct. 4, 2007

(30) Foreign Application Priority Data
Mar. 29, 2006 (JP) .............................. 2006-090451

(51) Int. Cl.
G06F 12/00 (2006.01)
G06F 13/00 (2006.01)
G06F 13/28 (2006.01)
G06F 15/173 (2006.01)

(52) U.S. Cl. ...................................... 711/170; 709/226
(58) Field of Classification Search ........................ None
See application file for complete search history.

(56) References Cited

U.S. PATENT DOCUMENTS
2005/0262299 A1* 11/2005 Mimatsu et al. ............. 711/114
2006/0109850 A1* 5/2006 Otani et al. ............... 370/395.2

FOREIGN PATENT DOCUMENTS
JP 2004-192305 12/2002
JP 2005-332220 5/2004

OTHER PUBLICATIONS

J. Satran et al., "RFC 3720 Internet Small Computer Systems Interface (iSCSI)", Network Working Group, Apr. 2004, pp. 1-202.
M. Bakke, "RFC 3721 Internet Small Computer Systems Interface (iSCSI) Naming and Discovery", Network Working Group, Apr. 2004, pp. 1-18.
J. Tseng et al., "RFC 4171 Internet Storage Name Service (iSNS)", Network Working Group, Sep. 2005, pp. 1-123.

* cited by examiner

Primary Examiner—Kevin L Ellis
Assistant Examiner—Chad L Davidson
(74) Attorney, Agent, or Firm—Reed Smith LLP; Juan Carlos A. Marquez, Esq.

(57) ABSTRACT

After a host creates a memory area in an external storage device, a setting is made such that the host can manage the memory area in the external storage device, so as to prevent an access to the storage device by another host to protect data therein. A second storage device creates a memory area therein, an iSNS server registers a lower DD between first and second storage devices, the first storage device makes a mapping-setting registration for names of a memory area for use and an external memory area, and the iSNS server registers an upper DD between the host and the first storage device, and the host mounts a memory area of the first storage device.

21 Claims, 14 Drawing Sheets

FIG.2A

222 GROUP MANAGEMENT TBL

| HOST | MEMORY AREA FOR USE | UPPER DD NAME | EXTERNAL MEMORY AREA | LOWER DD NAME | TOKEN |
|---|---|---|---|---|---|
| | MEMORY AREA 530 | | MEMORY AREA 630 | | ON |

222 GROUP MANAGEMENT TBL

| HOST | MEMORY AREA FOR USE | UPPER DD NAME | EXTERNAL MEMORY AREA | LOWER DD NAME | TOKEN |
|---|---|---|---|---|---|
| HOST 100 | MEMORY AREA 530 | A1 | MEMORY AREA 630 | B1 | ON |

322 DD MANAGEMENT TBL

| DD NAME | DD MEMBER |
|---|---|
| | |

322 DD MANAGEMENT TBL

| DD NAME | DD MEMBER |
|---|---|
| A1 | IP I/F160, IP I/F550 |
| B1 | IP I/F551, IP I/F650 |

323 NODE MANAGEMENT TBL

| NODE NAME (323a) | NODE TYPE (323b) |
| --- | --- |
| IP I/F160 | INITIATOR |
| IP I/F550 | TARGET |
| IP I/F551 | INITIATOR |
| IP I/F650 | TARGET |

FIG.5

422 ROUTING TBL

| SENDING DESTINATION (422a) | TRANSFER DESTINATION (422b) |
| --- | --- |
| IP I/F160 | IP I/F430 |
| IP I/F260 | IP I/F431 |
| IP I/F360 | IP I/F432 |
| IP I/F550 | IP I/F433 |
| IP I/F551 | IP I/F434 |
| IP I/F650 | IP I/F435 |
| OTHER DESTINATION | IP I/F436 |

FIG.6A

MAPPING SETTING MANAGEMENT TBL 523

| VIRTUAL MEMORY AREA (523a) | EXTERNAL MEMORY AREA (523b) |
| --- | --- |
|  |  |

FIG.6B

MAPPING SETTING MANAGEMENT TBL 523

| VIRTUAL MEMORY AREA (523a) | EXTERNAL MEMORY AREA (523b) |
| --- | --- |
| MEMORY AREA 530 | MEMORY AREA 630 |

FIG.17

1022 ROUTING TBL

| SENDING DESTINATION | TRANSFER DESTINATION |
|---|---|
| IP I/F760 | IP I/F1031 |
| IP I/F860 | IP I/F1032 |
| IP I/F960 | IP I/F1030 |
| IP I/F1150 | IP I/F1033 |
| IP I/F1151 | IP I/F1034 |
| OTHER DESTINATION | IP I/F1035 |

FIG.18

222 GROUP MANAGEMENT TBL

| HOST | MEMORY AREA FOR USE | UPPER DD NAME | EXTERNAL MEMORY AREA | LOWER DD NAME | TOKEN |
|---|---|---|---|---|---|
| | MEMORY AREA 530 | | MEMORY AREA 630 | | OFF |

822 GROUP MANAGEMENT TBL

| HOST | MEMORY AREA FOR USE | UPPER DD NAME | EXTERNAL MEMORY AREA | LOWER DD NAME | TOKEN |
|---|---|---|---|---|---|
| | MEMORY AREA 1130 | | MEMORY AREA 630 | | OFF |

822 GROUP MANAGEMENT TBL

| HOST | MEMORY AREA FOR USE | UPPER DD NAME | EXTERNAL MEMORY AREA | LOWER DD NAME | TOKEN |
|---|---|---|---|---|---|
| HOST 700 | MEMORY AREA 1130 | C1 | MEMORY AREA 630 | B2 | ON |

922 DD MANAGEMENT TBL

| DD NAME (922a) | DD MEMBER (922b) |
|---|---|
|  |  |

FIG.20B

922 DD MANAGEMENT TBL

| DD NAME (922a) | DD MEMBER (922b) |
|---|---|
| C1 | IP I/F760, IP I/F1150 |
| B2 | IP I/F1151, IP I/F650 |

FIG.21

923 NODE MANAGEMENT TBL

| NODE NAME (923a) | NODE TYPE (923b) |
|---|---|
| IP I/F760 | INITIATOR |
| IP I/F1150 | TARGET |
| IP I/F1151 | INITIATOR |
| IP I/F650 | TARGET |

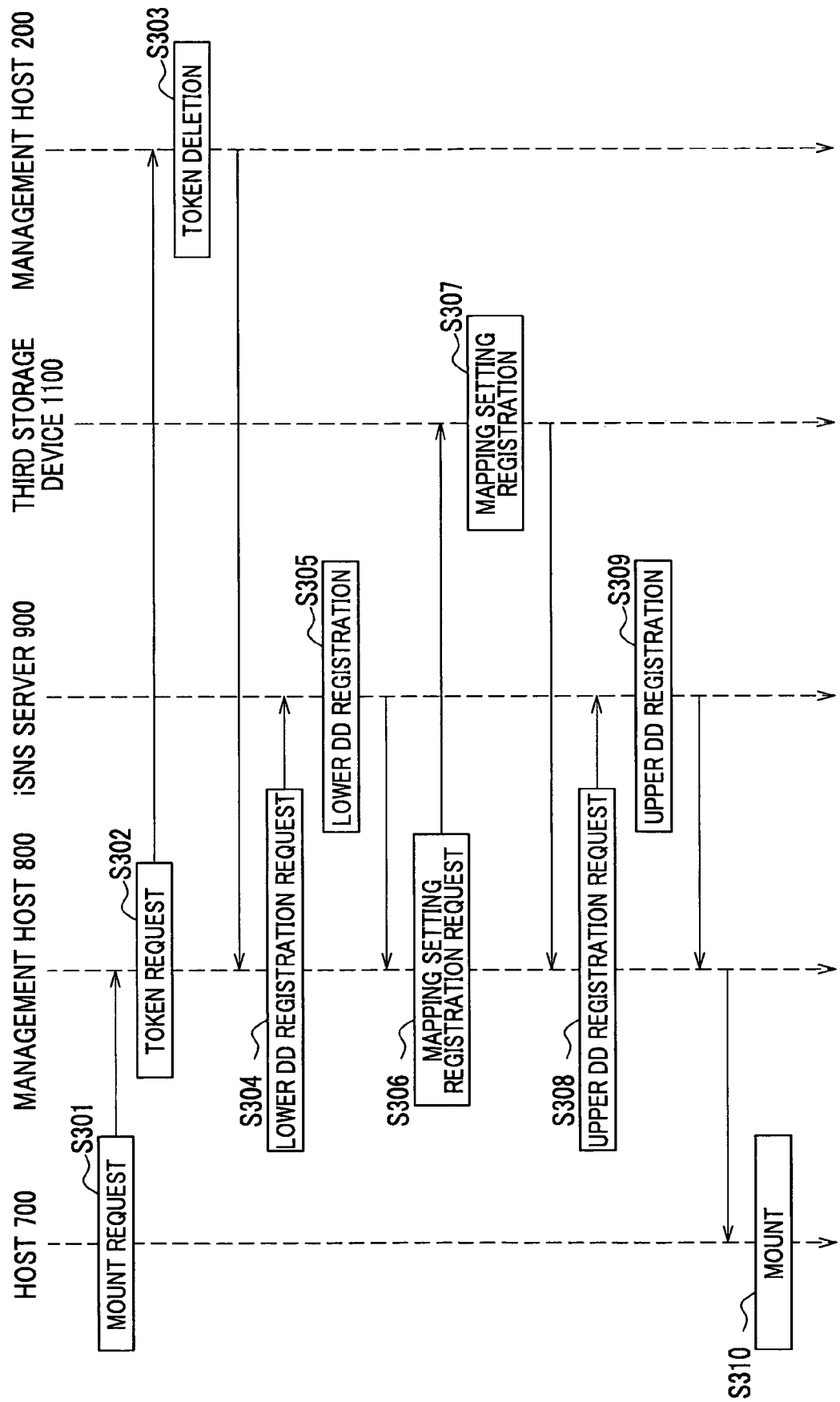

STORAGE SYSTEM AND METHOD FOR RESTRICTING ACCESS TO VIRTUAL MEMORY AREA BY MANAGEMENT HOST, AND PROGRAM FOR EXECUTING THE SAME

CLAIM OF PRIORITY

The present application claims priority from Japanese application JP 2006-90451 filed on Mar. 25, 2006, the content of which is hereby incorporated by reference into this application.

BACKGROUND OF THE INVENTION

1. Field of the Invention

The present invention relates to a technique for managing access restriction information in a storage system.

2. Description of the Related Art

In recent years, computers usually use an IP (Internet Protocol) network to connect to each other. A non-patent document by J. Satran, K. Meth, C. Sapuntzakis, M. Chadalapaka, E. Zeidner, "Internet Small Computer Systems Interface (iSCSI)", RFC3720, April 2004, published by the IETF (Internet Engineering Task Force) describes a technique in which iSCSI (internet Small Computer Systems Interface) is used to connect a storage device such as RAID (Redundant Array of Independent Disks) to the IP (Internet Protocol) network, and a SCSI (Small Computer Systems Interface) command for the storage device is capsuled into an IP packet to be sent to the device. This technique enables a computer to control a storage device by using the IP network.

Likewise with SCSI, iSCSI uses the client/server model, including an initiator for sending a SCSI command to request a processing such as data input/out, and a target for responding to a request such as data input/output. iSCSI is defined as the iSCSI layer in network layers, which is positioned between the SCSI layer and the TCP/IP (Transmission Control Protocol/Internet Protocol) layer. The iSCSI layer receives a SCSI CDB (Command Describe Block), a response and data from the SCSI layer, and capsules them into an iSCSI PDU (Protocol Data Unit) which is sent through a TCP connection. The iSCSI layer also processes an iSCSI PDU received through the TCP connection to extract and pass to the SCSI layer, a SCSI CDB, a response and data. In iSCSI, for sending a SCSI CDB, transferring data, and sending a SCSI response, SCSI Command PDU, SCSI Data In/Out PDU, and SCSI Response PDU are respectively used.

In iSCSI, nodes such as the initiator and target each have an iSCSI name for their identification and management. The iSCSI name is required to be independent from any geographic information of an iSCSI node, to be universally unique, and to be fixed from activation to completion of an iSCSI node. Formats usable with these iSCSI names include iSCSI Qualified Name and Extended Unique Identifier.

In iSCSI, the initiator needs an IP address, a TCP port number and an iSCSI name of the target in order to establish an iSCSI session to the target. A non-patent document by M. Bakke, J. Hafner, J. Hufferd, K. Voruganti, M. Krueger, "Internet Small Computer Systems Interface (iSCSI) Naming and Discovery", RFC3721, April 2004, describes the following three types of methods for the initiator to obtain the IP address, TCP port number and iSCSI name in iSCSI.

The first method is to directly set an IP address, a TCP port number and an iSCSI name to the initiator. The initiator uses the IP address and TCP port number of the target to establish a TCP connection, and uses the iSCSI name to establish an iSCSI connection.

The second method involves SendTargets, in which an IP address and a TCP port number are set in the initiator. The initiator uses the information to establish a discovery session with a network entity, to publish a SendTargets command for querying the target about an iSCSI name. Here, the network entity represents, for example, a device and a gateway accessible via the IP network. This second method is provided for an iSCSI gateway and an iSCSI router.

The third method is zero-configuration, in which no target information is set to the initiator. This method includes two types: the initiator directly multicasting to the target or sending a discovery message to a storage name server. Methods for realizing the discovery function of the target includes: use of SLP (Service Location Protocol) as described in RFC2608; and use of iSNS (Internet Storage Name Service) as described in RFC4171 (J. Tseng, K. Gibbons, F. Travostino, C. Du Laney, J. Souza, "Internet Storage Name Service (iSNS)", RFC4171, September 2005).

Of these methods, the iSNS is usually used for a large storage network.

As discussed in RFC4171, iSNS is a technique for realizing, for example, name solution for the initiator and the target, and group management for the initiator and the target by means of DD (Discovery Domain), in an IP-SAN (Internet Protocol-Storage Area Network) using iSCSI.

In iSNS, the initiator on activation uses a DevAttrReg message to register target information to an iSNS server. The DevAttrReg message includes: Source Attribute representing an iSCSI node of the originating sender; Message Key Attribute to be used to determine whether or not the node is an existing one; Delimiter Attribute used as a delimiter; and Operating Attribute describing additional information.

When sending on activation a DevAttrReg message to the iSNS server, if the initiator includes a DD name in the DevAttrReg message, i.e., specifies a DD by means of the DevAttrReg message, then the initiator can belong to the specified DD (this method will be hereinafter referred to as a "DD specification method"). This allows the initiator to discover a target belonging to the specified DD.

In contrast, when sending on activation the DevAttrReg message to the iSNS server, if the initiator includes no DD name in the DevAttrReg message, i.e., specifies no DD by means of the DevAttrReg message, then the initiator does not belong to any DD (this method will be hereinafter referred to as a "non-belonging DD method"). When a DD name is not included in the DevAttrReg message, the initiator can be specified to belong to a default DD (this method will be hereinafter referred to as a "default specification method"). When specified to belong to the default DD, the initiator can discover a target belonging to the default DD.

Japanese Patent Application Laid-Open (Kokai) No. 2004-192305 discloses a technique for providing a storage device with an iSCSI name which is a storage identification information, in a corresponding manner to a change of status in a storage device such as copying and moving data.

However, in the above-described DD specification method, in the case that a host computer (hereinafter referred to as a "host") uses a memory area in a storage device as a virtual memory area, and uses a memory area in another storage device (hereinafter referred to as an "external storage device") connected to the host via the storage device, the host is incapable of registering to the iSNS server a DD to which the external storage device belongs, after creating a memory area of the external storage device. In other words, after creating a memory area in the external storage device, the host is incapable of making a setting such that it can manage the memory area in the external storage device.

Further, in the non-belonging DD method, in the case that the host uses a memory area of a storage device as a virtual memory area, and uses a memory area in an external storage device, the host can not register to the iSNS server a DD to which the external storage device belongs, after creating a memory area in the external storage device. In other words, after creating the memory area in the external storage device, the host can not make a setting such that it can manage the memory area in the external storage device.

Still further, in the default specification method, although the host can discover an external storage device if the external storage device belongs to a default DD, the host is disadvantageously registered to the default DD, thus allowing other hosts belonging to the default DD to access the storage device.

In addition, in the technique disclosed in Japanese Patent Application Laid-Open No. 2004-192305, in the case that the host uses a memory area in the storage device as a virtual memory area, and uses a memory area in the external storage device, the host is incapable of registering to the iSNS server a DD to which the external storage device belongs, after creating a memory area in the external storage device. In other words, after creating a memory area in the external storage device, the host can not make a setting such that it can manage the memory area in the external storage device.

To solve the above-described problems, therefore, the present invention aims to allow the host to manage the memory area in the external storage device after creating a memory area in the external storage device, thus preventing other hosts from accessing the storage device to protect data in the storage device.

SUMMARY OF THE INVENTION

To achieve the above-mentioned purpose, a storage system according to the present invention comprises a management host which includes: a table for managing the mapping between or among storage devices; and a management table for handling as a group the tables managing a DD. With this arrangement, it becomes possible to create a DD of the external storage device after the creation of a memory area, in that, when a host sends a memory area creation request to the management host, the management host registers a DD to an iSNS server managing a DD between the storage devices, to make a mapping-setting between a storage device and an externally connected storage device, and then registers a DD to an iSNS server managing a DD between the host and the storage device.

In this manner, the invention effectively allows the host to manage the memory area in the external storage device after creating a memory area in the external storage device, thus preventing other hosts from accessing the storage device to protect data in the storage device.

BRIEF DESCRIPTION OF THE DRAWINGS

FIG. 2A is a block-diagram of a group management table before a DD is registered, according to a first embodiment of the invention, FIG. 2B is a block-diagram of a group management table after a DD is registered, according to a first embodiment of the invention.

FIG. 3A is a block-diagram of a DD management table before a DD is registered, according to a first embodiment of the invention.

FIG. 3B is a block-diagram of a DD management table after a DD is registered, according to a first embodiment of the invention.

FIG. 4 is a block-diagram of a node management table according to a first embodiment of the invention.

FIG. 5 is a block-diagram of a routing table according to a first embodiment of the invention.

FIG. 6A is a block-diagram of a mapping-setting management table before a mapping is set, according to a first embodiment of the invention.

FIG. 6B is a block-diagram of a mapping-setting management table after a map is set, according to a first embodiment of the invention.

FIG. 17 is a block-diagram of a routing TBL managed by an IP switch in a second site.

FIG. 18 is a block-diagram of a group management TBL managed by a management host in a first site.

FIG. 19A is a block-diagram of a group management TBL before a token is obtained, which is managed by a management host in a second site.

FIG. 19B is a block-diagram of a group management TBL after a token is obtained, which is managed by a management host in a second site.

FIG. 20A is a block-diagram of a DD management TBL before a DD is registered, which is managed by an iSNS server in a second site.

FIG. 20B is a block-diagram of a DD management TBL after a DD is registered, which is managed by an iSNS server in a second site.

FIG. 21 is a block-diagram of a node management TBL managed by an iSNS server in a second site.

FIG. 24 is a flowchart of a mount process according to a second embodiment of the invention.

DESCRIPTION OF THE PREFERRED EMBODIMENTS

Figure 1:
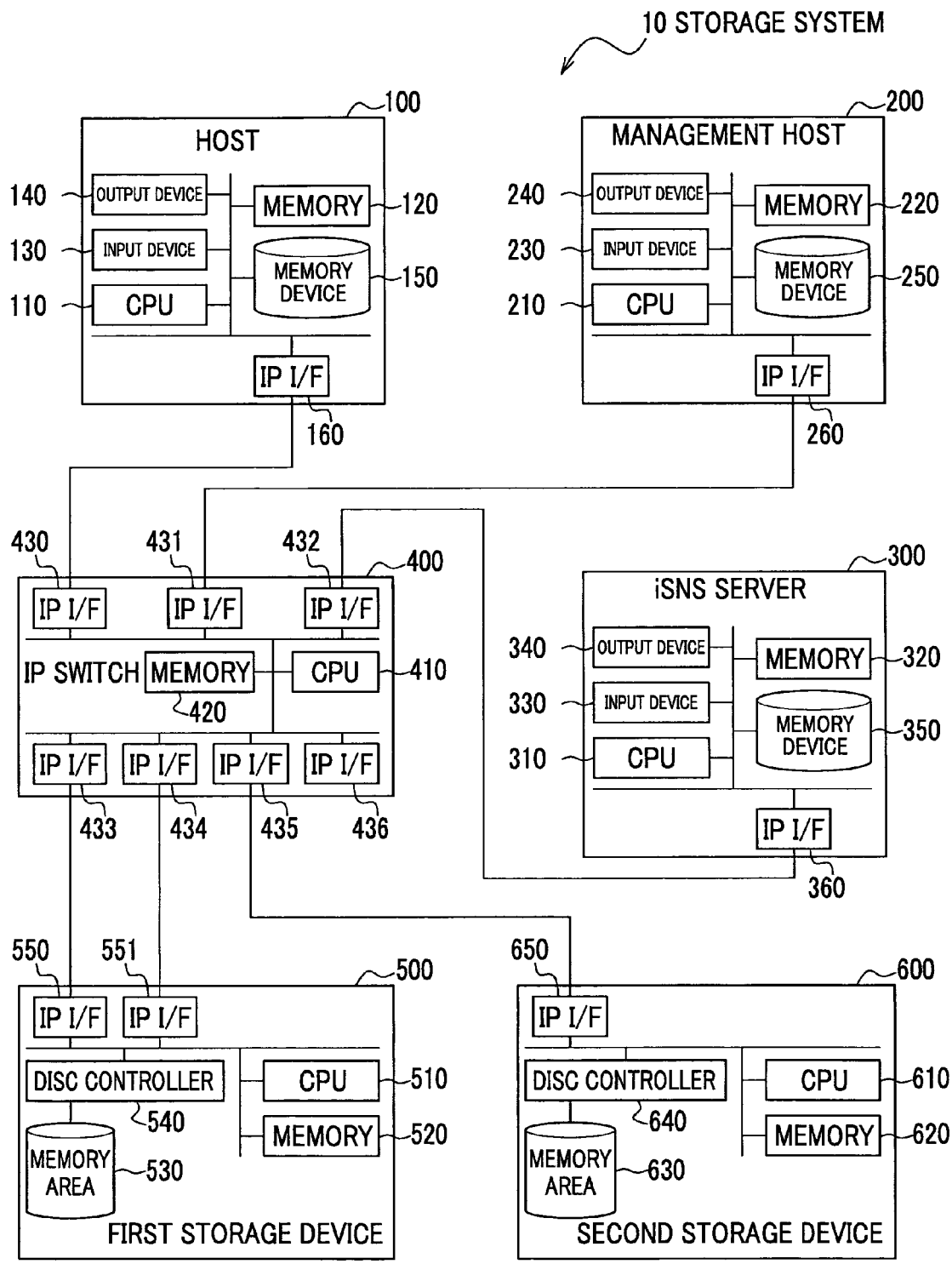
FIG. 1 is a system block-diagram according to a first embodiment of the invention.

Referring to the drawings, embodiments of the present invention will be described in detail.

General Description of First Embodiment

In a first embodiment, a memory area of a second storage device is virtually set as a memory area of a first storage device, and the memory area of the first storage device is used from a (requesting) host.

System Configuration of First Embodiment

FIG. 1 is a block-diagram of a storage system according to the first embodiment of the invention. As shown in the drawing, the storage system 10 includes a host 100, a management host 200, an iSNS server 300, a first storage device 500 and a second storage device 600, which are connected by an IP switch 400.

The host 100 includes a CPU 110, a memory 120, an input device 130, an output device 140, a memory device 150, and an IP I/F 160, which are connected by a bus.

The CPU 110 executes a program to totally control the host 100.

The memory 120 stores a program to be executed by the CPU 110, and serves as a memory area used by the CPU 110 to execute the program.

The input device 130 is for inputting information from a user, which includes a keyboard, mouse, for example.

The output device 140 displays information for a user, and is a display, for example.

The memory device 150 stores a program to be loaded into the memory 120 and executed by the CPU 110, and user data, for example.

The IP I/F 160 is connected to an IP I/F 430 of the IP switch 400, to send/receive data to/from the IP I/F 430. The IP I/F 430 will be discussed in more detail later.

The management host 200 is a computer for managing, for example, the host 100, the first storage device 500 and the second storage device 600, and includes a CPU 210, a memory 220, an input device 230, an output device 240, a memory device 250 and an IP I/F 260, which are connected by a bus.

The CPU 210 executes a program to totally control the host 100.

The memory 220 stores a program to be executed by the CPU 210, and serves as a memory area used by the CPU 210 to execute the program.

The input device 230 is for inputting information from a user, and is a keyboard, mouse, for example.

The output device 240 displays information for a user, and is a display, for example.

The memory device 250 stores a program to be loaded into the memory 220 and executed by the CPU 210, and user data, for example.

The IP I/F 260 is connected to the IP I/F 431 of the IP switch 400, to send/receive data to/from the IP I/F 431. The IP I/F 431 will be discussed in more detail later.

The iSNS server 300 functions as an iSNS server as defined in RFC, and includes a CPU 310, a memory 320, an input device 330, an output device 340, a memory device 350 and an IP I/F 360, which are connected by a bus.

The CPU 310 executes a program to totally control the iSNS server 300.

The memory 320 stores a program to be executed by the CPU 310, and serves as a memory area used by the CPU 310 to execute the program.

The input device 330 is for inputting information from a user, and is a keyboard, mouse, for example.

The output device 340 displays information for a user, and is a display, for example.

The memory device 350 stores a program to be loaded into the memory 320 and executed by the CPU 310, and user data, for example.

The IP I/F 360 is connected to an IP I/F 432 of the IP switch 400, to send/receive data to/from the IP I/F 432. The IP I/F 432 will be discussed in more detail later.

The IP switch 400 comprises a CPU 410, a memory 420, an IP I/F 430, the IP I/F 431, an IP I/F 432, an IP I/F 433, an IP I/F 434, an IP I/F 435 and an IP I/F 436, which are connected by a bus.

The CPU 410 executes a program to totally control the IP switch 400.

The memory 420 stores a program to be executed by the CPU 410, and serves as a memory area used by the CPU 410 to execute the program.

The IP I/F 430 is connected to the IP I/F 160 of the host 100, and sends/receives data to/from the IP I/F 160.

The IP I/F 431 is connected to the IP I/F 260 of the management host 200, and sends/receives data to/from the IP I/F 260.

The IP I/F 432 is connected to the IP I/F 360 of the iSNS server 300, and sends/receives data to/from the IP I/F 360.

The IP I/F 433 is connected to an IP I/F 550 of the first storage device 500, and sends/receives data to/from the IP I/F 550.

The IP I/F 434 is connected to the IP I/F 551 of the first storage device 500, and sends/receives data to/from the IP I/F 551.

The IP I/F 435 is connected to the IP I/F 650 of the second storage device 600, and sends/receives data to/from the IP I/F 650.

The first storage device 500 comprises a CPU 510, a memory 520, a memory area 530, a disc controller 540, an IP I/F 550, and an IP I/F 551, which are connected by a bus.

The CPU 510 executes a program to totally control the first storage device 500.

The memory 520 stores a program to be executed by the CPU 510, and serves as a memory area used by the CPU 510 to execute the program.

The memory area 530 stores data.

The disc controller 540 controls the memory area 530.

The IP I/F 550 is connected to the IP I/F 433 of the IP switch 400 to send/receive data to/from the IP I/F 433.

The IP I/F 551 is connected to the IP I/F 434 of the IP switch 400 to send/receive data to/from the IP I/F 434.

The second storage device 600 comprises a CPU 610, a memory 620, a memory area 630, a disc controller 640, and an IP I/F 650, which are connected by a bus.

The CPU 610 executes a program to totally control the second storage device 600.

The memory 620 stores a program to be executed by the CPU 610, and serves as a memory area used by the CPU 610 to execute the program.

The memory area 630 stores data.

The disc controller 640 controls the memory area 630.

The IP I/F 650 is connected to the IP I/F 435 of the IP switch 400, to send/receive data to/from the IP I/F 435.

Table Configuration of First Embodiment

FIGS. 2A and 2B each illustrate a block-diagram of a group management table (hereinafter referred to as a "group management TBL") before and after a DD is registered, respectively, which is managed by the management host. With reference to FIGS. 2A, 2B, and, if necessary, FIG. 1, the group management TBL will be described.

As shown in FIG. 2A, the group management TBL 222 before the DD registration includes a host 222a, a memory area for use 222b, an upper DD name 222c, an external memory area 222d, a lower DD name 222e, and a token 222f.

The host 222a is an identifier for a host that uses the memory area.

The memory area for use 222b is an identifier indicating a memory area used by the host 222a.

The upper DD name 222c is a name indicating the DD between the host 222a and a storage device having the memory area for use 222b.

The external memory area 222d is an identifier for indicating, when the memory area for use 222b is provided as a virtual memory area, an external memory area corresponding to the virtual memory area.

The lower DD name 222e is a name for indicating the DD between the memory area for use 222b and the external memory area 222d.

The token 222f is an area for storing an "ON" or "OFF" value. In the first embodiment, the token 222f is not used.

As shown in FIG. 2A, values of the memory area for use 222b and the external memory area 222d are set in the group management TBL 222.

The group management TBLs 222 before and after the DD registration as shown in FIGS. 2A and 2B are similar in configuration. Compare to the group management TBL 222 in FIG. 2A, the group management TBL 222 in FIG. 2B is added with values of the host 222a, the upper DD name 222c, and the lower DD name 222e.

FIGS. 3A and 3B each show a block-diagram of a DD management table (hereinafter referred to as a "DD management TBL") before and after the DD registration, respectively, which is managed by the iSNS server. Referring to FIGS. 3A, 3B and, if necessary, FIG. 1, the DD management TBL will be described.

As shown in FIG. 3A, the DD management TBL 322 before the DD registration includes a DD name 322a and a DD member 322b.

The DD name 322a is the name of a DD.

The DD member 322b indicates an identifier for a member belonging to the DD indicated by the DD name 322a. As the DD member 322b, an interface address may be used, for example.

As shown in FIGS. 3A, 3B, the DD management TBLs before and after the DD registration are similar in configuration. Compare to the DD management TBL 322 shown in FIG. 3A, the DD management TBL 322 shown in FIG. 3B is added with values of the DD name 322a and the DD member 322b.

FIG. 4 is a block-diagram of a node management table (hereinafter referred to as a "node management TBL") managed by the iSNS server 300. Referring to FIG. 4, the node management TBL will be discussed.

As shown in FIG. 4, the node management TBL 323 includes a node name 323a and a node type 323b.

The node name 323a shows an identifier for a node, for which an interface address may be used, for example.

The node type 323b shows a type of a node indicated by the node name 323a. In the node type 323b, an identifier may be set indicating an initiator that requests a process such as data input/output, or an identifier indicating a target that responds to a request such as data input/output.

FIG. 5 is a block-diagram of a routing table (hereinafter referred to as a "routing TBL") managed by the IP switch. Referring to FIG. 5 and, if necessary, FIG. 1, the routing TBL will be described.

As shown in FIG. 5, the routing TBL 422 includes a sending destination 422a and a transfer destination 422b.

The sending destination 422a indicates an identifier for a node of the sending destination, for which an interface address may be used, for example.

The transfer destination 422b is the interface in the IP switch 400 to be used when sending data to the sending destination 422a. For the transfer destination 422b, an interface address, for example, may be used.

FIGS. 6A, 6B each show a block-diagram of a mapping-setting management table (hereinafter referred to as a "mapping-setting management TBL") before and after a mapping is set, respectively, which is managed by the first storage device 500. Referring to FIGS. 6A, 6B and, if necessary, FIG. 1, the mapping-setting management TBL will be described.

As shown in FIG. 6A, the mapping-setting management TBL 523 after the mapping-setting includes a virtual memory area 523a and an external memory area 523b.

The virtual memory area 523a shows an identifier for indicating a virtual memory area. The external memory area 523b shows an identifier for indicating an external memory area.

Figure 7:
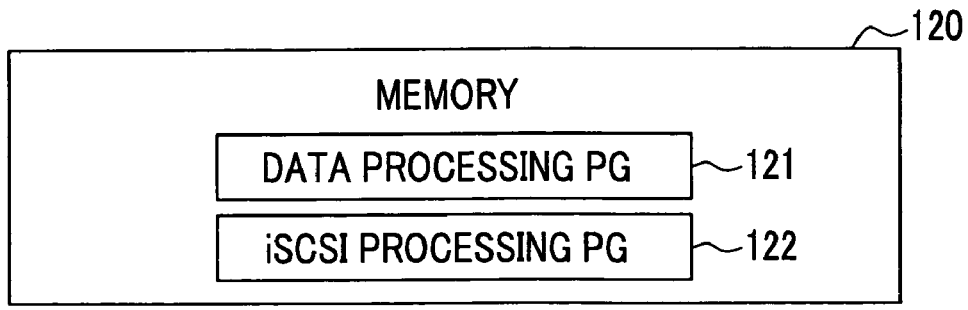
FIG. 7 is a memory block-diagram of a host according to a first embodiment of the invention.

As shown in FIGS. 6A and 6B, the virtual memory areas 523 before and after the mapping-setting are similar in configuration. Compared to the former, the latter is added with values of the virtual memory area 523a and the external memory area 523b, Memory Configuration of First Embodiment FIG. 7 is a memory block-diagram of the host of the first embodiment of the present invention. Referring to FIG. 7 and, if necessary, FIG. 1, the host memory will be described.

On activation, the host 100 reads into the memory 120 a data processing program 121 (hereinafter referred to as a "data processing PG") and an iSCSI processing program 122 (hereinafter referred to as an "iSCSI processing PG") stored in the storage device 150.

The data processing PG 121 sends a memory area creation request message to the management host 200 via the iSCSI processing PG 122 and processing data received via the iSCSI processing PG 122. The data processing PG 121, if it receives a response message from the iSCSI processing PG 122 notifying the completion of the creation of the memory area (hereinafter referred to as a "memory area creation acknowledgement message"), then mounts a virtual memory area of the first storage device 500, based on the memory area name notified by the memory area creation acknowledgement message. The data processing PG 121, after sending to the first storage device 500 a request for inputting/outputting data to/from the mounted virtual memory area, performs data input/output to/from the memory area of the second storage device 600 via the first storage device 500.

The data processing PG 121 also sends an unmount request message including a memory area name to the management host 200 via iSCSI processing PG 122, and processing data received via the iSCSI processing PG 122. The data processing PG 121, if it receives from the iSCSI processing PG 122 a response message acknowledging the completion of unmount preparation (hereinafter referred to as an "unmount preparation acknowledgement message"), sends an unmount request message to the first storage device 500, and then, as a result of the unmount request, unmounts the external memory area of the second storage device 600 via the first storage device 500.

The iSCSI processing PG 122 capsuls into an IP packet and sends to a destination, data received from the data processing PG 121, and decapsuls and passes to the data processing PG 121, a received IP packet.

Figure 8:
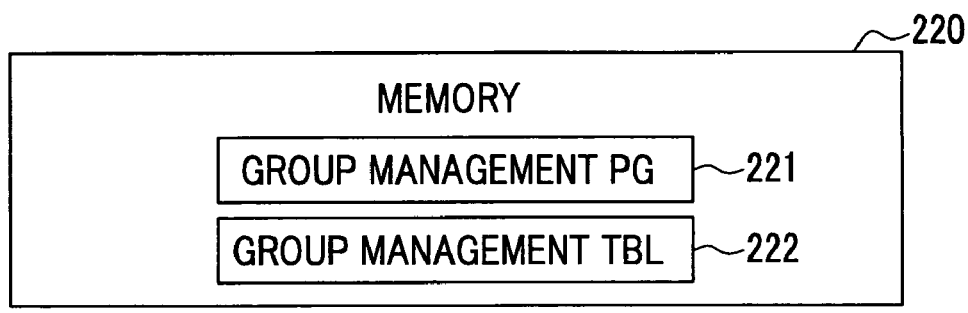
FIG. 8 is a memory block-diagram of a management host according to a first embodiment of the invention.

FIG. 8 is a memory block-diagram of a management host of the first embodiment of the invention. Referring to FIG. 8 and, if necessary, FIG. 1 or 2, the memory of the management host will be described.

The management host 200 on activation reads into the memory 220, a group management program 221 (hereinafter referred to as a "group management PG") and information in the group management TBL 222 (see FIG. 2A) stored in the memory device 250.

The group management PG 221, on receiving a memory area creation request message from the host 100, refers to the group management TBL 222 (FIG. 2A) to determine a sending destination of the memory area creation request message, and then sends the message to the determined destination. Specifically, the group management PG 221 obtains a piece of data from the group management TBL 222 (FIG. 2A) to determine the external memory area 222d as the sending destination.

The group management PG 221 is also a program which, if it receives a response message acknowledging the completion of the creation of a memory area in response to the memory area creation request message, then sends to the iSNS server, a message requesting a registration of a lower DD (hereinafter referred to as a "lower DD registration request message") including the memory area for use 222b (name of memory area for use) and the external memory area 222d (name of external memory area) contained in the one piece of data obtained from the group management TBL 222 (FIG. 2A).

Further, the group management PG 221, if it receives a response message acknowledging the completion of the registration of the lower DD (hereinafter referred to as a "lower DD registration acknowledgement message") in response to the message requesting the registration of the lower DD, sends to the first storage device 500 a message requesting the registration of a mapping-setting (hereinafter referred to as a "mapping-setting registration request message") including the memory area for use 222b (name of memory area for use) and the external memory area 222d (name of external memory area) contained in the one piece of data obtained from the group management TBL 222 (FIG. 2A).

Still further, the group management PG 221, if it receives a response message acknowledging the completion of the registration of the mapping-setting (hereinafter referred to as a "mapping-setting registration acknowledgement message") in response to the mapping-setting registration request message, sends to the iSNS server 300, a message requesting the registration of an upper DD (hereinafter referred to as an "upper DD registration request message") including: the host name contained in the memory area creation request message sent from the host 100; and the memory area for use 222b contained in the one piece of data obtained from the group management TBL 222 (FIG. 2A).

Yet further, the group management PG 221, if it receives a response message acknowledging the completion of the registration of the upper DD (hereinafter referred to as an "upper DD registration acknowledgement message") in response to the upper DD registration request message, then registers: the host name of the host 100 included in the memory area creation request message sent from the host 100; the name of the registered lower DD (lower DD name) contained in the lower DD registration acknowledgement message; and the name of the registered upper DD (upper DD name) contained in the upper DD registration acknowledgement message, to the host 222a, the upper DD name 222c, and the lower DD name 222e in the group management TBL 222 (FIG. 2A), respectively. After the registration, a status is obtained as shown in FIG. 2B. On completion of the registration, the group management PG 221 also sends to the host 100, a memory area creation acknowledgement message including the memory area for use 222b (name of memory area for use) contained in the one piece of data obtained from the group management TBL 222 (FIG. 2A).

Also, the group management PG 221, on receiving an unmount request message from the host 100, obtains the upper DD name 222c from the group management TBL 222 (FIG. 2B), based on the memory area name included in the unmount request message sent from the host 100. The group management PG 221 also sends to the iSNS server 300 a message requesting the deletion of an upper DD including the obtained upper DD name 222c (hereinafter referred to as an "upper DD deletion request message").

Further, the group management PG 221, if it receives a response message acknowledging the completion of the deletion of the upper DD (hereinafter referred to as an "upper DD deletion acknowledgement message") in response to the upper DD deletion request message, then sends to the first storage device 500 a message requesting the deletion of a mapping-setting (hereinafter referred to as a "mapping-setting deletion request message") containing a memory area name (memory area 530) included in the unmount request message sent from the host 100.

Still further, the group management PG 221, if it receives a response message acknowledging the completion of the deletion of the mapping-setting (hereinafter referred to as a "mapping-setting deletion acknowledgement message") in response to the mapping-setting deletion request message, then obtains the lower DD name 222e from the group management TBL 222 (FIG. 2B), based on the memory area name contained in the unmount request message sent from the host 100. The group management PG 221 sends to the iSNS server 300 a message requesting the deletion of a lower DD including the obtained lower DD 222e (hereinafter referred to as a "lower DD deletion request message").

Yet further, the group management PG 221, if it receives a response message acknowledging the completion of the deletion of the lower DD (hereinafter referred to as a "lower DD deletion acknowledgement message") in response to the lower DD deletion request message, then obtains from the group management TBL 222 (FIG. 2B), data corresponding to the memory area name (memory area 530) or data having the memory area for use 222b, contained in the unmount request message sent from the host 100, and deletes from the group management TBL 222 (FIG. 2B), the host 222a, the upper DD name 222c and the lower DD name 222e of the obtained data. After the deletion, a status is obtained as shown in FIG. 2A. On completion of the deletion, the group management PG 221 sends to the host 100 an unmount preparation acknowledgement message.

The group management TBL 222 has the configuration as shown in FIG. 8A or 8B.

Figure 9:
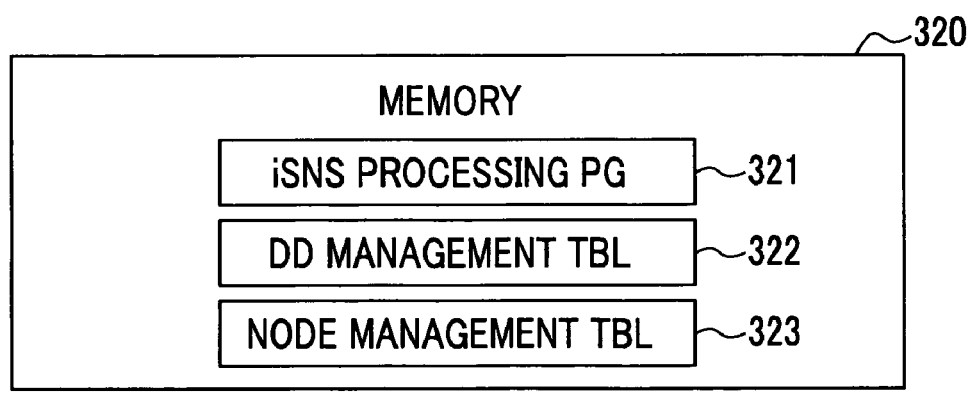
FIG. 9 is a memory block-diagram of an iSNS server according to a first embodiment of the invention.

FIG. 9 is a memory block-diagram of the iSNS server of the first embodiment of the invention. Referring to FIG. 9 and, if necessary, FIG. 1, 3 or 4, memory of the iSNS server will be discussed.

On activation, the iSNS server reads into the memory 320 an iSNS processing program 321 (hereinafter referred to as an "iSNS processing PG"), information in the DD management TBL 322 (DD management information), and the node management TBL 323 (FIG. 4) stored in the memory device 350.

The iSNS processing program 321, on receiving a lower DD registration request message from the management host 200, obtains from a table not shown, interface addresses each corresponding to names of the memory area for use and the external memory area included in the lower DD registration request message, and obtains a name from the table not shown. The iSNS processing PG 321 registers the obtained name to the DD name 322a (FIG. 3A), and each of the obtained interface addresses to the DD member 322b (FIG. 3B). After the registration, a status is obtained as shown in FIG. 3B.

Furthermore, the iSNS processing program 321 registers identifiers each indicating the name of the memory area for use and the initiator, and those indicating the name of the external memory area and the target, included in the lower DD registration request message, to the node name 323a and the node type 323b, respectively. This registration process allows the discovery of the memory area 630 of the second storage device from the first storage device 500.

Additionally, on completion of the registration, the iSNS processing program 321 sends a lower DD registration acknowledgement message to the management host 200.

The iSNS processing program 321, on receiving the upper DD registration request message from the management host 200, performs the same processing as when receiving the lower DD registration request message from the management host 200, and then sends the upper DD registration acknowledgement message to the management host 200. Also, likewise with the reception of the lower DD registration request message from the management host 200, the registration process allows the discovery of the memory area 530 of the first storage device 500 from the host 100.

The iSNS processing program 321, on receiving the upper DD deletion request message from the management host 200, deletes from the DD management TBL 322, data having the DD name 322a (FIG. 3B) corresponding to the DD name (A1) contained in the upper DD deletion request message. This deletion processing allows the discovery of the memory area 530 of the first storage device 500 from the host 100. The iSNS processing program 321, on completion of the deletion, sends the upper DD deletion acknowledgement message to the management host 200.

The iSNS processing program 321, on receiving the lower DD deletion request message from the management host 200, deletes from the DD management TBL 322, data with the DD name 322a (FIG. 3B) corresponding to the DD name (B1) included in the lower DD deletion request message. After the deletion, a status is obtained as shown in FIG. 3A. This deletion processing disallows the discovery of the memory area 630 of the second storage device 600 from the first storage device 500. On completion of the deletion, the iSNS processing program 321 sends the lower DD deletion acknowledgement message to the management host 200.

Figure 10:
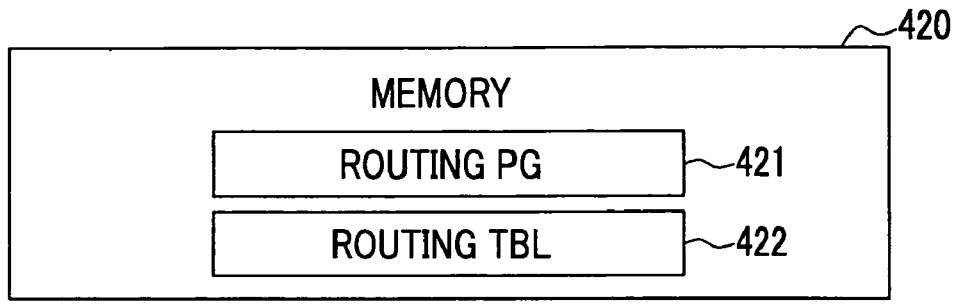
FIG. 10 is a memory block-diagram of an IP switch according to a first embodiment of the invention.

FIG. 10 is a memory block-diagram of an IP switch of the first embodiment of the invention. Referring to FIG. 10 and, if necessary, FIG. 1, memory of the IP switch will be described.

On activation, the IP switch 400 reads into the memory 420 a routing program 421 (hereinafter referred to as a "routing PG") and information in the routing TBL 422 of FIG. 5 (routing information) stored in a memory device not shown.

When an interface in the IP switch 400 receives a message, the routing PG 421 retrieves from the routing TBL 422 (FIG. 5) the sending destination 422a and the transfer destination 422b corresponding to the interface address, and then sends and transfers the message thereto.

The routing TBL 422 has the configuration shown in FIG. 5.

Figure 11:
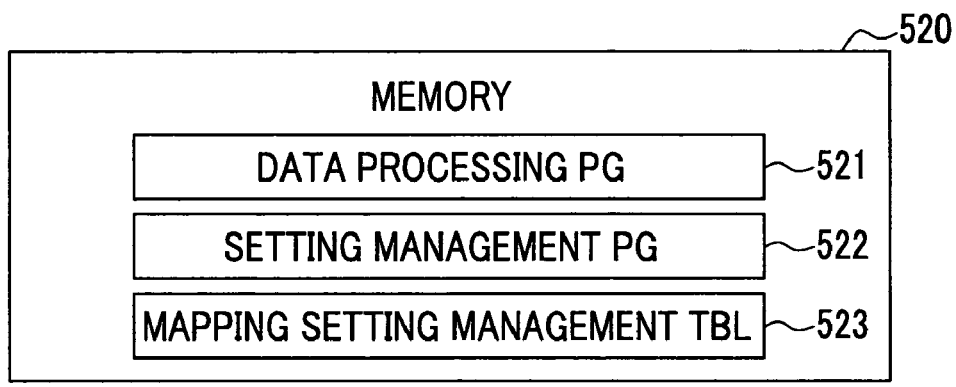
FIG. 11 is a memory block-diagram of a first storage device according to a first embodiment of the invention.

FIG. 11 is a memory block-diagram of the first storage device of the first embodiment of the invention. Referring to FIG. 11 and, if necessary, FIG. 1 or 6, memory of the first storage device will be discussed.

The first storage device 500 on activation reads into the memory 520, a data processing program 521 (hereinafter referred to as a "data processing PG"), a setting management program 522 (hereinafter referred to as a "setting management PG"), and information in the mapping-setting management table 523 of FIG. 6B (hereinafter referred to as the "mapping-setting management TBL") stored in a memory device not shown. This information is hereinafter referred to as the mapping-setting management information.

In response to a data input/output request received from the host 100, the data processing program 521 requests the second storage device 600 to perform data input/output.

The setting management PG 522, on receiving the mapping-setting registration request message from the management host 200, registers names of the memory area for use and the external memory area included in the mapping-setting registration request message, to the virtual memory area 523a and the node type 323b in the mapping-setting management TBL 523 (FIG. 6A), respectively. After the registration, a status is obtained as shown in FIG. 6B. On completion of the registration, the setting management PG 522 sends to the host 200 the mapping-setting registration acknowledgement message. The setting management PG 522 also manages various pieces of information which are set in the first storage device 500.

Further, the setting management PG 522, on receiving the mapping-setting deletion request message from the management host 200, deletes from the mapping-setting management TBL 523, data in the virtual memory area 523a (FIG. 6b) corresponding to the memory area name (memory area 530) contained in the mapping-setting deletion request message. On completion of the deletion, the setting management PG 522 sends the mapping-setting deletion acknowledgement message to the management host 200.

The mapping-setting management TBL 523 has the configuration as shown in FIG. 6A or 6B.

Figure 12:
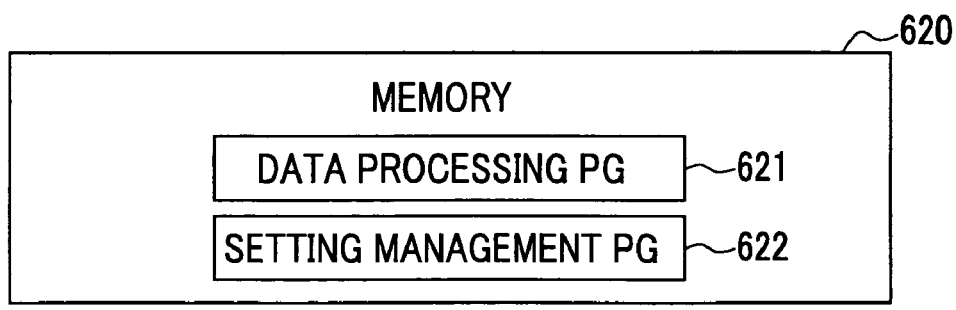
FIG. 12 is a memory block-diagram of a second storage device according to a first embodiment of the invention.

FIG. 12 is a memory block-diagram of the second storage device of the first embodiment of the invention. Referring to FIG. 12 and, if necessary, FIG. 1, memory of the second storage device will be discussed.

The second storage device 600 on activation reads into the memory 620, a data processing program 621 (hereinafter referred to as a "data processing PG") and a setting management program 622 (hereinafter referred to as a "setting management PG") stored in a memory device not shown.

The data processing PG 621 inputs/outputs the data in the memory area of the second storage device 600 to/from the host 100 via the first storage device 500, in response to a data input/output request received from the host 100 via the first storage device 500.

The setting management PG 622 manages various pieces of information which are set in the second storage device 600. The setting management PG 622 also creates a memory area on receiving the memory area creation request message from the management host 200. On completion of the memory area creation in a normal manner, the setting management PG 622 sends the memory area creation acknowledgement message to the management host 200.

Memory Area Creation Processing of the First Embodiment

Figure 13:
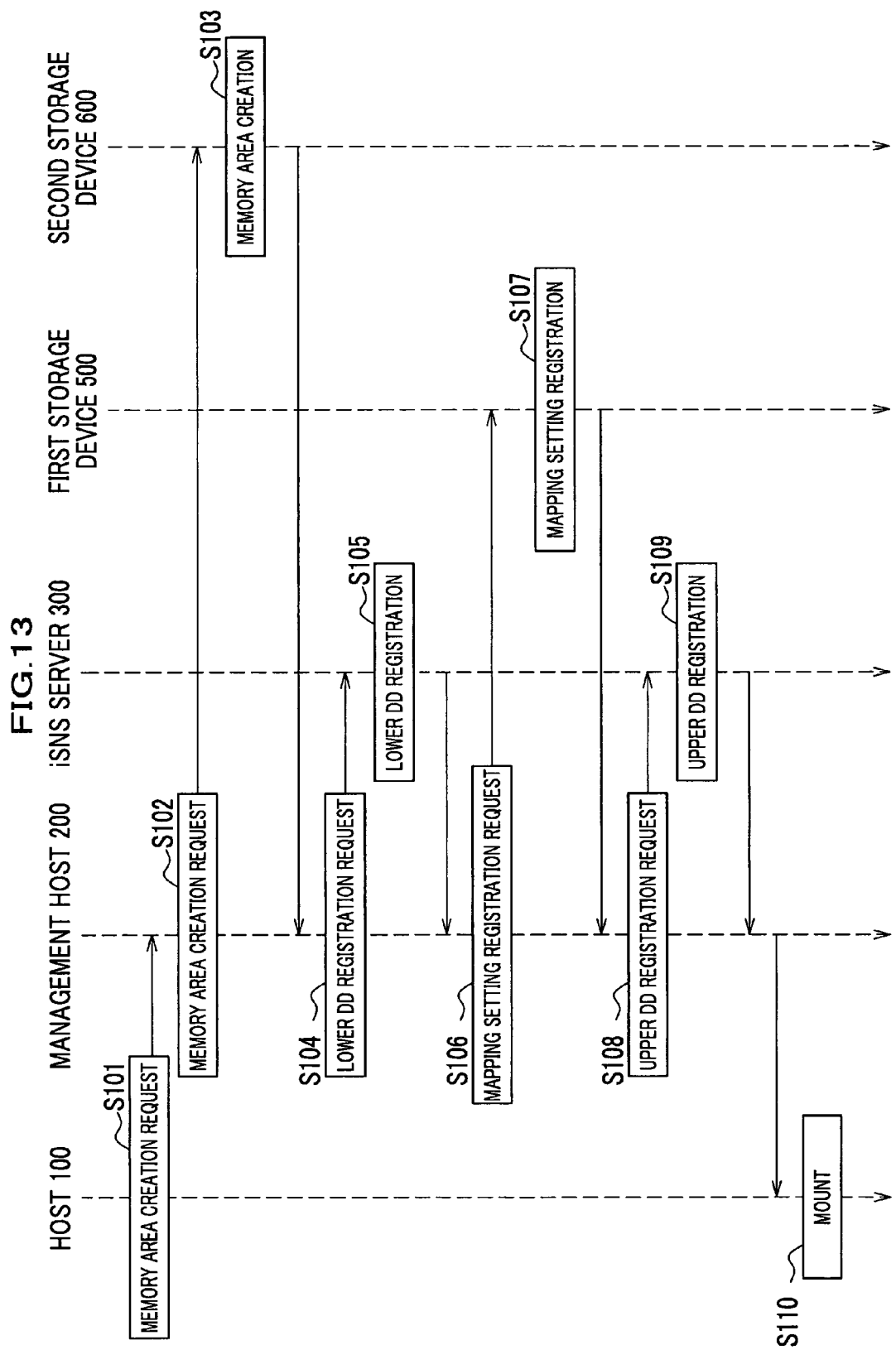
FIG. 13 is a flowchart of a memory area creation process according to a first embodiment of the invention.

FIG. 13 is a flowchart of a memory area creation process according to the first embodiment of the invention. Here, an example case will be described in which the host 100 uses the memory area 630 of the second storage device 600 via the memory area 530 of the first storage device 500. It is presumed that the memory area 630 initially does not exist in the second storage device 600, nor does the memory area 500, which is the virtual memory area of the memory area 630, exist in the first storage device 500. Referring to FIG. 13 and, if necessary, FIGS. 1 to 12, the flow of the memory area creation process will be described.

Firstly, the data processing PG 121 of the host 100 sends a memory area creation request to the management host 200 (Step 101). Then, the group management PG 221 of the management host 200, on receiving the memory area creation request message sent from the data processing PG 121, sends a memory area creation request to the second storage device 600 (Step 102). The setting management PG 622 of the second storage device 600, on receiving the memory area creation request message sent from the group management PG 221, creates the memory area 630 in the second storage device 600 (Step 103). The setting management PG 622 sends a memory area creation acknowledgement message to management host 200.

Next, the group management PG 221 of the management host 200, on receiving the memory area creation acknowledgement message from the setting management PG, sends a lower DD registration request to the iSNS server 300 (Step 104). The iSNS processing PG 321 of the iSNS server 300 registers to the DD name 322*a* a DD name (B1) between the first storage device 500 and the second storage device 600, and then registers to the DD member 322*b*, IP I/F551 and IP I/F650 of the first storage device 500 and the second storage device 600, respectively (Step 105). This step allows the discovery of the memory area 630 of the second storage device 600 from the first storage device 500. The iSNS processing PG 321 of the iSNS server 300 sends a lower DD registration acknowledgement message to the management host 200.

Next, the group management PG 221 of the management host 200, on receiving the lower DD registration acknowledgement message sent from the iSNS processing PG 321, sends a mapping-setting registration request to the first storage device 500 (Step 106). The setting management PG 522 of the first storage device 500, on receiving the mapping-setting registration request from the group management PG 221, registers the memory areas 530 and 630 to the mapping-setting management TBL 523 (Step 107). The setting management PG 522 sends a mapping-setting registration acknowledgement message to the management host 200.

The group management PG 221 of the management host 200, on receiving a mapping-setting registration acknowledgement message from the setting management PG 522 of the first storage device 500, sends an upper DD registration request message to the iSNS server 300 (Step 108). The iSNS processing PG 321 of the iSNS server 300 registers to the DD name 322*a* a DD name (A1) between the host 100 and the first storage device 500, and then registers to the DD member 322*b*, IP I/F160 and IP I/F550 of the host 100 and the first storage device 500, respectively (Step 109). This step allows the discovery of the memory area 530 of the first storage device 500 from the host 100. The iSNS processing PG of the iSNS server 300 sends an upper DD registration acknowledgement message to the management host 200.

The group management PG 221 of the management host 200, on receiving the upper DD registration acknowledgement message sent from the iSNS processing PG 321, registers the host name, the upper DD name and the lower DD name to the host 222*a*, the upper DD name 222*c* and the lower DD name 222*e*, respectively, in the group management TBL 222 to send a memory area creation acknowledgement message to the host 100.

The host 100, on receiving the memory area creation acknowledgement message sent from the group management PG 221, mounts the memory area 530 which is a virtual memory area (Step 110).

Unmount Processing of First Embodiment

Figure 14:
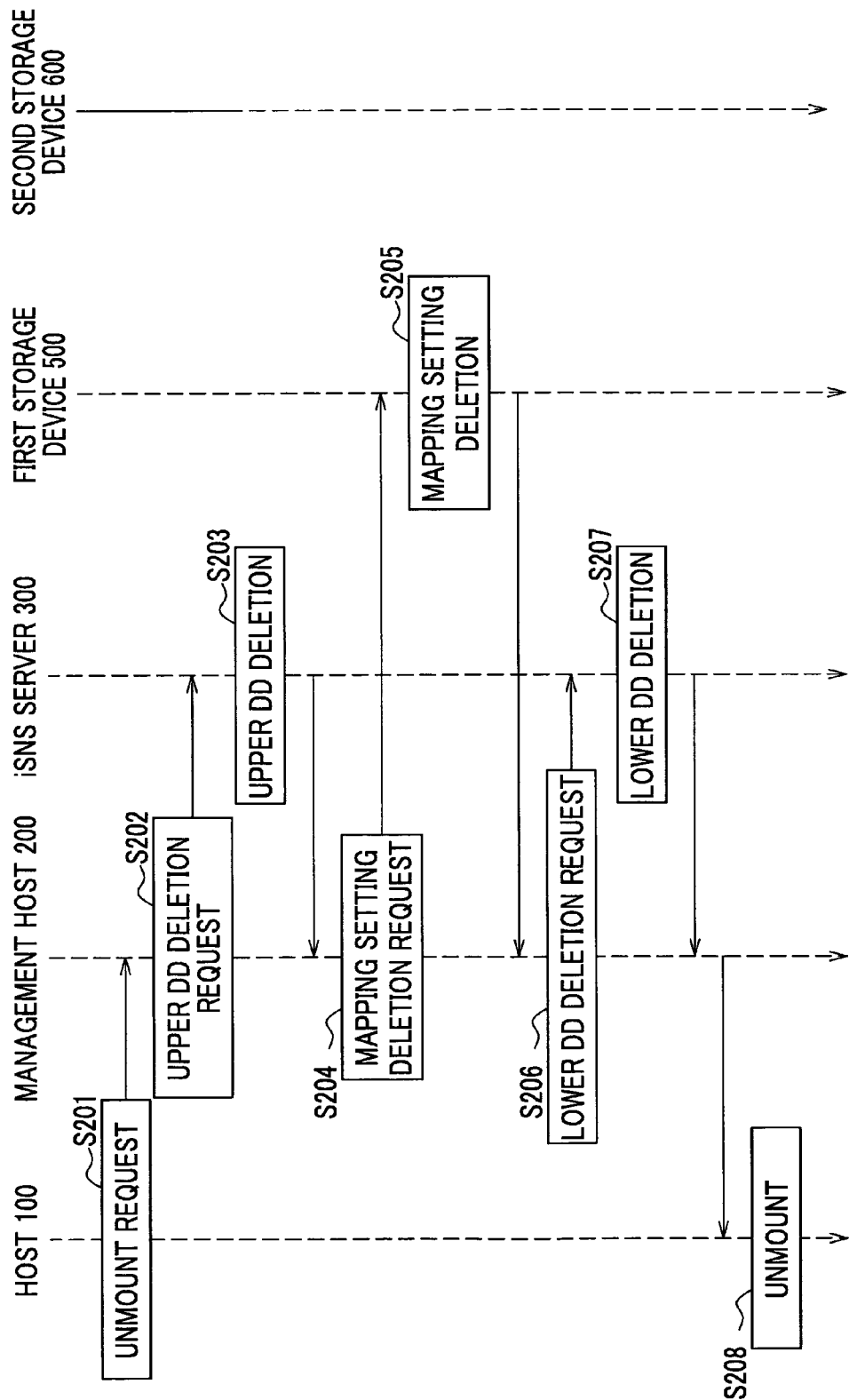
FIG. 14 is a flowchart of an unmount process according to a first embodiment of the invention.

FIG. 14 is a flowchart of an unmount processing according to the first embodiment of the invention. Here, an example case will be described for unmounting the memory area 630 of the second storage device 600 used from the host 100 via the memory area 530 of the first storage device 500. Referring to FIG. 14 and FIGS. 1 to 12, the flow of the unmount processing will be discussed.

Firstly, the data processing PG 121 of the host 100 sends an unmount request to the management host 200 (Step 201). Next, the group management PG 221 of the management host 200, on receiving the unmount request sent from the data processing PG 121, sends an upper DD deletion request message to the iSNS server 300 (Step 202). The iSNS processing PG 321 of the iSNS server 300, on receiving the upper DD deletion request sent from the group management PG 221, deletes from the DD management TBL 322 the DD name (A1) between the host 100 and the first storage device 500 (Step 203). This step disallows the discovery of the memory area 530 of the first storage device 500 from the host 100. The iSNS processing PG 321 of the iSNS server 300 sends a lower DD deletion acknowledgement message to the management host 200.

Thereafter, the group management PG 221 of the management host 200, on receiving the lower DD deletion acknowledgement message sent from the iSNS processing PG 321, sends a mapping-setting registration request to the first storage device 500 (Step 204). The setting management PG 522 of the first storage device 500, on receiving the mapping-setting deletion request from the group management PG 221, deletes from the mapping-setting management TBL 523 the mapping-setting data wherein the virtual memory area 523*a* is the memory area 530 (Step 205). The setting management PG 522 sends a mapping-setting deletion acknowledgement message to management host 200.

The group management PG 221 of the management host 200, on receiving the mapping-setting deletion acknowledgement message from the setting management PG 522, sends a lower DD deletion request to the iSNS server 300 (Step 206). The iSNS processing PG 321 of the iSNS server 300, on receiving the lower DD deletion request from the group management PG 221, deletes from the DD management TBL 322 the DD (named B1) between the first storage device 500 and the second storage device 600 (Step 207). This step disallows the discovery of the memory area 630 of the second storage device 600 from the first storage device 500. The iSNS processing PG 321 sends a lower DD deletion acknowledgement message to the management host 200.

Then, the group management PG 221 of the management host 200, on receiving the lower DD deletion acknowledgement message sent from the iSNS processing PG 321, deletes from the group management TBL 222, the host 222*a*, the upper DD name 222*c*, and the loser DD name 222*e*, to sends an unmount preparation acknowledgement message to the host 100.

The host 100, on receiving the unmount preparation acknowledgement message sent from the group management PG 221, unmounts the memory area 530 which is a virtual memery area (Step 208).

Group Management Table Edit Screen of First Embodiment

Figure 15:
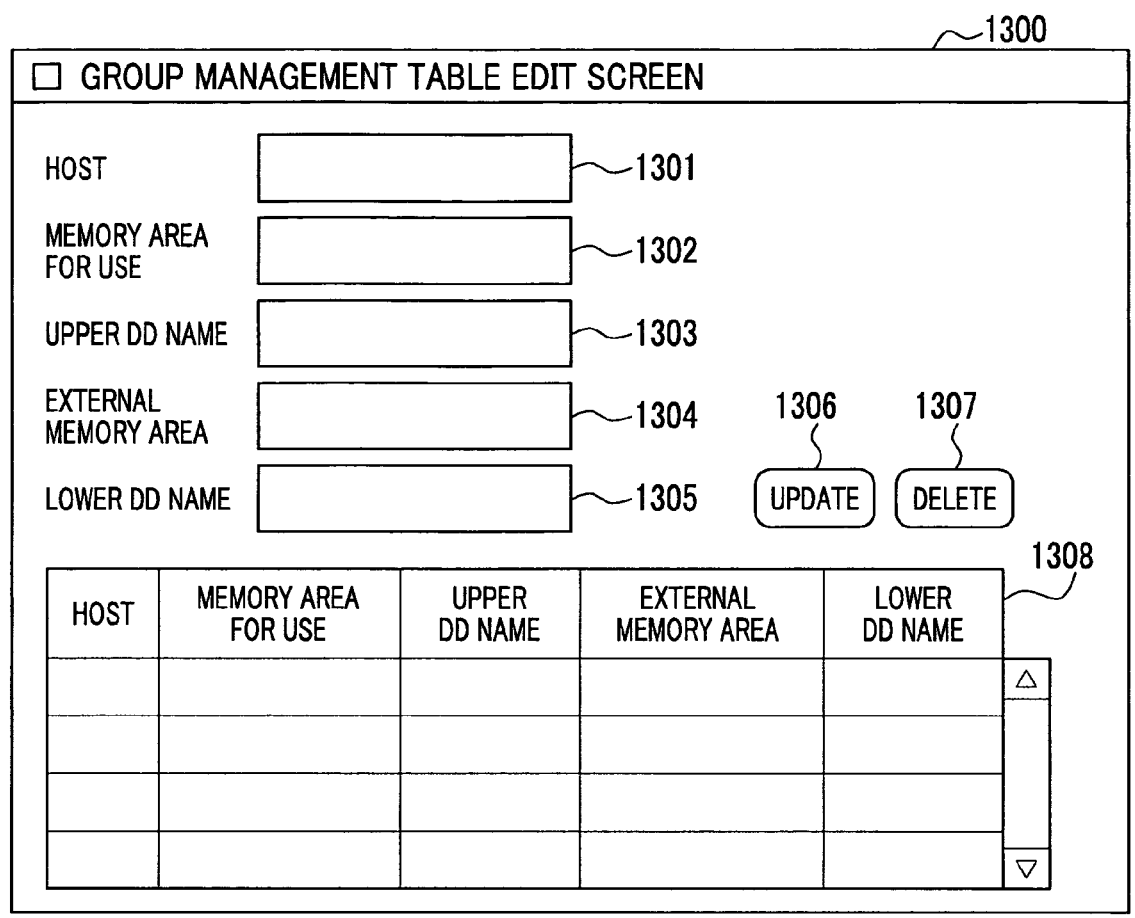
FIG. 15 is a group management table edit screen according to a first embodiment of the invention.

FIG. 15 shows an edit screen for the group management table. The group management table edit screen 1300 is for editing the group management TBL 222, which is operated to activate the group management TBL 222 to allow the registration, edit and deletion with respect to the group management TBL 222.

The group management table edit screen 1300 includes an input text box for the host 1301, an input text box for the memory area for use 1302, an input text box for the upper DD name 1303, an input text box for the external memory area 1304, an input text box for the lower DD name 1305, an update button 1306, a delete button 1307, and a group management TBL list box 1308.

The input text box for the host 1301 is a text box for inputting a host name. The input text box for the memory area for use 1302 is a text box for inputting a memory area for use. The input text box for the upper DD name 1303 is a text box for inputting an upper DD name. The input text box for the external memory area 1304 is a text box for inputting an external memory area. The input text box for the lower DD name 1305 is a text box for inputting a lower DD name. The update button 1306 is a button for reflecting the inputted data on the group management TBL 222. The delete button 1307 is a button for deleting selected data from the group management TBL 222. The group management TBL list box 1308 is a list box for displaying a list of data registered in the group management TBL 222.

Selecting data shown on the group management TBL list box 1308 by means of a click, for example, will correspondingly display the selected item of data in the input text box for the host 1301, the input text box for the memory area for use 1302, the input text box for the upper DD name 1303, the input text box for the external memory area 1304, and the input text box for the lower DD name 1305.

Clicking the update button 1306 or the delete button 1307 for any data shown on a text box will update or delete the data, respectively.

Effects of First Embodiment

In the first embodiment, it is possible to virtually set the memory area 630 of the second storage device 600 as the memory area 530 of the first storage device 500, to allow the use of the memory area 530 from the host 100. Thus, registering the DD after the creation of the memory area 630 allows prevention of the access from another host and data protection.

Also, deleting the DD after the unmount request for the memory area 530 allows prevention of access from another host and data protection.

General Description of Second Embodiment

The second embodiment is employed when, for example, it is required to change, for a purpose such as performing a backup, the setting of the memory area of the second storage device from as being virtually set as a memory area of the first storage device, to being set as a memory area of a third storage device, so as to allow the use of the memory area in the third storage device from the host. In the second embodiment, a function is added to the first embodiment for switching the memory area for use by the host by rewriting the value of the token provided in the group management table of the management host.

System Configuration of Second Embodiment

Figure 16:
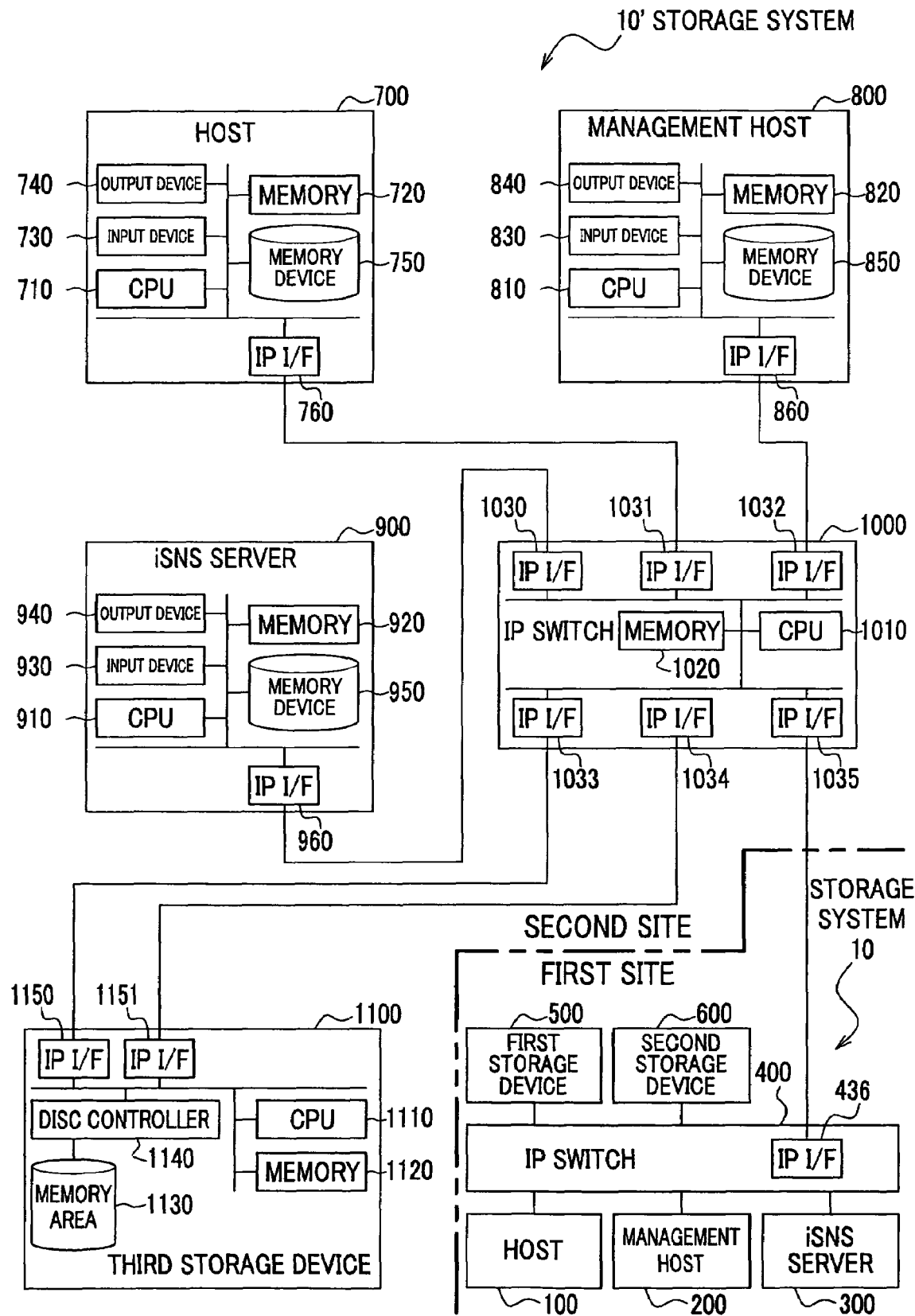
FIG. 16 is a block-diagram of a storage system according to a second embodiment of the invention.

FIG. 16 is a block-diagram of a storage system of the second embodiment of the invention. As shown in FIG. 16, a storage system 10' comprises first and second sites. The first site is similar in form to the storage system 10 described in the first embodiment. The second site of the storage system 10' includes a host 700, a management host 800, an iSNS server 900 and a third storage device 1100, which are connected by an IP switch 1000. The first and second sites are connected by the connection between the IP switch 1000 and the IP switch 400.

The host 700 includes a CPU 710, a memory 720, an input device 730, an output device 740, a memory device 750, and an IP I/F 760, which are connected by a bus.

The CPU 710 executes a program to totally control the host 700.

The memory 720 stores a program to be executed by the CPU 710, and serves as a memory area used by the CPU 710 to execute the program.

The input device 730 is for inputting information from the user, and is a keyboard and a mouse, for example.

The output device 740 is for displaying information for the user, and is a display, for example.

The memory device 750 stores a program to be loaded into the memory 720 to be executed by the CPU 710, and user data, for example.

The IP I/F 760 is connected to and sends/receives data to/from an IP I/F 1031 of the IP switch 1000. The IP I/F 1031 will be discussed later.

The management host 800 is a computer for managing, for example, the host 700, the second storage device 600 and the third storage device 1100. The management host 800 comprises a CPU 810, a memory 820, an input device 830, an output device 840, a memory device 850 and an IP I/F 860, which are connected by a bus.

The CPU 810 executes a program to totally control the management host 800.

The memory 820 stores a program to be executed by the CPU 810, and serves as a memory area used by the CPU 810 to execute the program.

The input device 830 is for inputting information from the user, and is a keyboard and a mouse, for example.

The output device 840 is for displaying information for the user, and is a display, for example.

The memory device 850 stores a program to be loaded into the memory 820 to be executed by the CPU 810, and user data, for example.

The IP I/F 860 is connected to and sends/receives data to/from the IP I/F 1032 of the IP switch 1000. The IP I/F 1032 will be discussed later.

The iSNS server 900 functions as an iSNS server such as defined in RFC, and includes a CPU 910, a memory 920, an input device 930, an output device 940, a memory device 950, and an IP I/F 960, which are connected by a bus.

The CPU 910 executes a program to totally control the iSNS server 900.

The memory 920 stores a program to be executed by the CPU 910, and serves as a memory area used by the CPU 910 to execute the program.

The input device 930 is for inputting information from the user, and is a keyboard and a mouse, for example.

The output device 940 is for displaying information for the user, and is a display, for example.

The memory device 950 stores a program to be loaded into the memory 920 to be executed by the CPU 910, and user data, for example.

The IP I/F 960 is connected to and sends/receives data to/from an IP I/F 1030 of the IP switch 1000. The IP I/F 1030 will be discussed later.

The IP switch 1000 includes a CPU 1010, a memory 1020, the IP I/F 1030, the IP I/F 1031, the IP I/F 1032, an IP I/F 1033, an IP I/F 1034, and an IP I/F 1035, which are connected by a bus.

The CPU 1010 executes a program to totally control the IP switch 1000.

The memory 1020 stores a program to be executed by the CPU 1010, and serves as a memory area used by the CPU 1010 to execute the program.

The IP I/F 1030 is connected to and sends/receives data to/from the IP I/F 960 of the iSNS server 900.

The IP I/F 1031 is connected to and sends/receives data to/from the IP I/F 760 of the host 700.

The IP I/F 1032 is connected to and sends/receives data to/from the IP I/F 860 of the iSNS server 800.

The IP I/F 1033 is connected to and sends/receives data to/from the IP I/F 1150 of the third storage device 1100.

The IP I/F 1034 is connected to and sends/receives data to/from the IP I/F 1151 of the third storage device 1100.

The IP I/F 1035 is connected to and sends/receives data to/from IP I/F 436 of the IP switch 400 in the first site.

The third storage device 1100 includes a CPU 1110, a memory 1120, a memory area 1130, a disc controller 1140, an IP I/F 1150, and an IP I/F 1151, which are connected by a bus.

The CPU 1110 executes a program to totally control the third storage device 1100.

The memory 1120 stores a program to be executed by the CPU 1110, and serves as a memory area used by the CPU 1110 to execute the program.

The memory area 1130 stores data.

The disc controller 1140 controls the memory area 1130.

The IP I/F 1150 is connected to and sends/receives data to/from IP I/F 1033 of the IP switch 1000.

The IP I/F 1151 is connected to and sends/receives data to/from IP I/F 1034 of the IP switch 1000.

Table Configuration of Second Embodiment

FIG. 17 is a block-diagram of a routing TBL managed by the IP switch of the second site. Referring to FIG. 17 and, if necessary, FIG. 16, the routing TBL will be describe.

As shown in FIG. 17, the routing TBL 1022 includes a sending destination 1022a and a transfer destination 1022b.

The sending destination 1022a indicates an identifier for a node of the sending destination. For the sending destination 1022a, an interface address can be used, for example.

The transfer destination 1022b indicates an interface in the IP switch 1000 for use to send data to the sending destination 1022a. For the transfer destination 1022b, an interface address may be used, for example.

FIG. 18 shows a block-diagram of a group management TBL after the deletion of a token, which is managed by the management host of the first site. Referring to FIG. 18 and, if necessary, FIG. 16, the group management TBL will be described.

As shown in FIG. 18, the group management TBL 222 after the deletion of the token, includes a host 222a, a memory area for use 222b, an upper DD name 222c, an external memory area 222d, a lower DD name 222e, and a token 222f. The group management TBL 222 has the same configuration as FIG. 2A except the token 222f updated to OFF after the deletion of the token.

FIGS. 19A and 19B each show a block-diagram of the group management TBL before and after the token is obtained, respectively, which is managed by the management host of the second site. Referring to FIGS. 19A, 19B and, if necessary, FIG. 16, the group management TBL will be discussed.

As shown in FIG. 19A, the group management TBL 822 before obtaining the token includes a host 822a, a memory area for use 822b, an upper DD name 822c, an external memory area 822d, a lower DD name 822e, and a token 822f. The group management TBL 822 has the same configuration as FIG. 2A, except that the token value is set to "OFF" because the token is not yet obtained.

As shown in FIG. 19A and 19B, the group management TBLs 822 have the similar configuration, the latter being added with values in the host 822a, the upper DD name 822c, and the lower DD name 822e. The value of the token 822f is rewritten to "ON", as shown in FIG. 19B.

FIGS. 20A and 20B each show a block-diagram of a DD management TBL before and after a DD is registered, respectively, which is managed by the iSNS server in the second site. Referring to FIGS. 20A, 20B and, if necessary, FIG. 16, the DD management TBL will be described.

As shown in FIG. 20A, the DD management TBL 922 before the DD registration includes a DD name 922a and a DD member 922b, and is the same as FIG. 3A in configuration.

As shown in FIG. 20A and 20B, the DD management TBLs 922 have the similar configuration, the latter being added with values in the DD name 922a and the DD member 922b.

FIG. 21 is a block-diagram of a node management TBL managed by the iSNS server in the second site. Referring to FIG. 21 and, if necessary, FIG. 16, the node management TBL will be described.

As shown in FIG. 21, the node management TBL 923 includes a node name 923a and a node type 923b, and is the same as FIG. 4 in configuration.

Figure 22A:
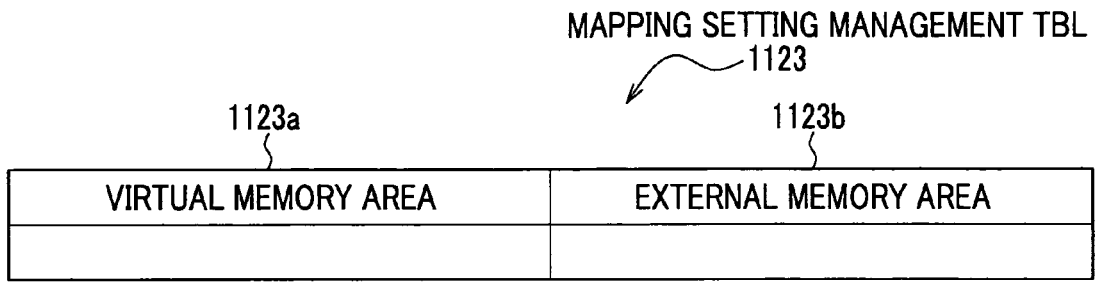
FIG. 22A is a block-diagram of a mapping-setting management TBL before a mapping is set, which is managed by a third storage device.
Figure 22B:
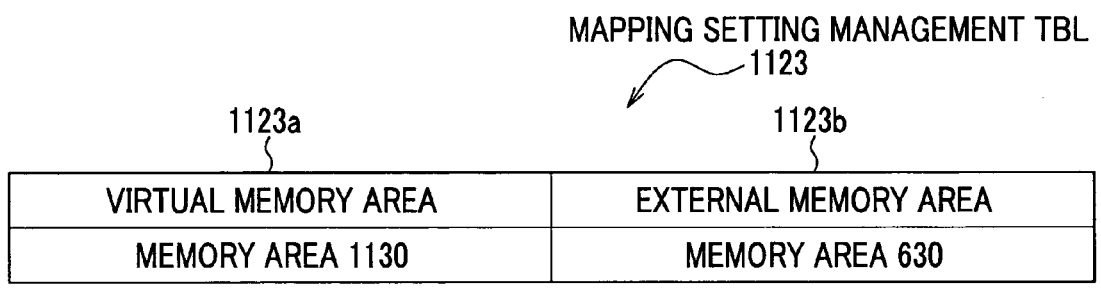
FIG. 22B is a block-diagram of a mapping-setting management TBL after a mapping is set, which is managed by a third storage device.

FIGS. 22A and 22B each show a block-diagram of a mapping-setting management TBL 1123 before and after the mapping-setting, respectively, which is managed by the third storage device. Referring to FIGS. 22A, 22B, and, if necessary, FIG. 16, the mapping-setting management TBL will be discussed.

As shown in FIG. 22A, the mapping-setting management TBL 1123 before the mapping-setting includes a virtual memory area 1123a and an external memory area 1123b, and is the same as FIG. 6A in configuration.

As shown in 22B, the mapping-setting management TBL 1123 after the mapping-setting has the similar configuration to that of FIG. 22A, and is added with vales in the virtual memory area 1123a and the external memory area 1123b.

Memory Configuration of Second Embodiment

Figure 23:
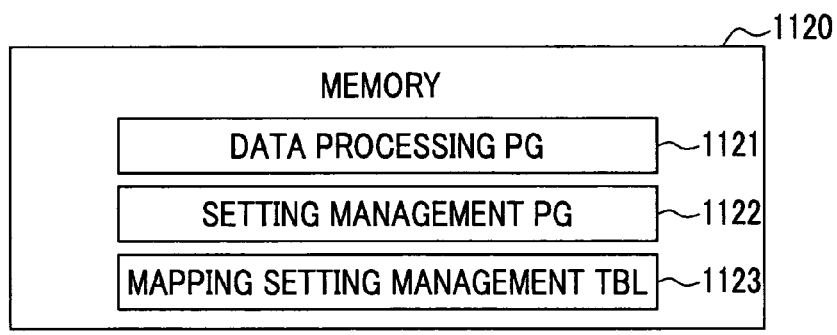
FIG. 23 is a memory block-diagram of a third storage device according to a second embodiment of the invention.

FIG. 23 is a memory block-diagram of the third storage device of the second embodiment of the invention. Referring to FIG. 23 and, if necessary, FIG. 16, memory of the third storage device will be discusses.

The third storage device on activation reads into the memory 1120 a data processing PG 1121, a setting management PG 1122, and information in the mapping-setting management TBL 1123 in FIG. 22 (mapping-setting management information) stored in a memory device not shown. The data processing PG 1121, the setting management PG 1122, and the mapping-setting management TBL 1123 have the similar functions as the data processing program 521, the setting management program 522, and the mapping-setting management table 523 shown in FIG. 11, respectively.

FIG. 23 illustrates a memory configuration of the third storage device. Other components in the second site of the storage system 10', such as the host, the switch, the server and the devices, have the similar memory configuration as that of the first site (the storage system 10) in the storage system 10. Programs in the second embodiment differs from those of the first embodiment in that functions for obtaining and deleting a token are added to the group management PG 221, which will be described below.

The group management PG 221, on receiving a mount request message from the host 700, obtains the external memory area 822d from the group management TBL 822 (FIG. 19A) based on a memory area name included in the mount request message sent from the host 700.

The group management PG 221 sends to the host 200 a message for requesting a token containing the obtained external memory area 822d (memory area name). This message will be hereinafter referred to as a "token request message".

The group management PG 221, on receiving the token request message from the management host 800, retrieves the group management TBL (FIG. 2A) based on the memory area name included in the token request message sent from the management host 800, to update the token 222f to "OFF" for data corresponding to the memory area name contained in the token request message sent from the management host 800. The group management PG 221 sends a token response message to the management host 800.

Further, the group management PG 221, on receiving the token response message from the management host 200, updates the token 222f to "ON" for data corresponding to the memory area name included in the mount request message sent from the host 700. The group management PG 221 also sends to the iSNS server 900, a message for requesting the registration of a lower DD including the memory area for use 822b (name of memory area for use) and the external memory area 822d (name of external memory area) contained in one piece of data obtained from the group management TBL 822 (FIG. 19A). This message is hereinafter referred to as a "lower DD registration request message".

Mount Processing of Second Embodiment

FIG. 24 is a flowchart of a mount processing of the second embodiment of the invention. Here, a case will be described wherein the mount processing is performed to allow host 700 to use the memory area 630 of the second storage device 600 via the memory area 1130 of the third storage device 1100. The mount processing differs from the memory area creation processing (FIG. 13) in the initial status in that the creation of the memory area 630 of the second storage device 600 is already complete. Referring to FIG. 24 and, if necessary, FIGS. 1 to 23, the flow of the mount processing will be described below, although processing in Step 304 and onward will be omitted as being the same as those in Step 104 and onward in the memory area creation processing in the first embodiment shown in FIG. 13.

First, the data processing PG 121 of the host 700 sends a mount request to the management host 800 (Step 301). The group management PG 221 of the management host 800, on receiving the mount request sent from the data processing PG 121, sends a token request to the management host 200 (Step 302). The group management PG 221 of the management host 200, on receiving a token request sent from the group management PG 221 of the management host 800, sets the token 222f in the group management TBL 222 (FIG. 2A) to "OFF" (FIG. 18) to delete the token (Step 303), and then sends a token response message to the management host 800.

The group management PG 221 of the management host 800, on receiving the token response message sent from the group management PG 221 of the management host 200, sets the token 822f in the group management TBL (FIG. 19A) to "ON" (FIG. 19B) to obtain a token, and then sends a lower DD registration request to the iSNS server 900.

Effects of Second Embodiment

The second embodiment allows the use of the memory area 630 of the second storage device 600 from the host 700, by virtually setting the memory area 630 of the second storage device 600 as the memory area 1130 of the third storage device 1100, under the condition where the memory area 630 of the second storage device 600 is virtually set as the memory area 530 of the first storage device 500. Thus, registering a DD after switching the use of the memory area for use to another host permits prevention of access from another host and data protection become possible.

Also, in a similar manner, deleting a DD after switching the use of the memory area for use to another host allows prevention of access from another host and data protection become possible.

According to the embodiments of the present invention, a storage system connected to a network is provided with means for managing a group between a storage device to which the host is connected and a DD between externally connected storage devices that the storage device is virtually using, in addition to the iSNS program for DD registration processing, for example. Consequently, it becomes possible to register/delete the DD after the creation of a memory area in the externally connected storage, thus preventing access from another host and protecting data.

Further, registering/deleting the DD after switching the use of the memory area for use to another host allows prevention of access from another host and data protection.

From the aforementioned descriptions, those skilled in the art ascertain the essential characteristics of the present invention and can make the various modifications and variations to the present invention to adapt it to various usages and conditions without departing from the spirit and scope of the claims.

What is claimed is:

1. A storage system having first and second storage devices; a management host for managing the first and second storage devices; a requesting host for making a request directed to a memory area for use of the first storage device; and an Internet storage name service (iSNS) server for managing a discovery domain (DD), and a network connecting among the storage devices, the server and the hosts, wherein:

the management host comprises a processing portion and a memory portion;

the memory portion of the management host stores group management information including a name of the memory area for use of the first storage device and a name of an external memory area physically configured in the second storage device, said memory area for use being a virtual memory area presented to the requesting host as configured in the first storage device while mapped to the external memory area;

the management host notifies the second storage device of the name of the external memory area, based on the name of the memory area for use;

the second storage device configures a memory area in the second storage device as the external memory area with the name of the external memory area notified from the management host;

the iSNS server registers a lower DD between the first and second storage devices;

the first storage device registers a mapping-setting of the name of the memory area for use and the name of the external memory area;

the iSNS server registers an upper DD between the requesting host and the first storage device; and the requesting host mounts on the memory area for use of the first storage device, and manages the external memory area after the external storage area is configured.

2. A storage system as claimed in claim 1, wherein the processing portion of the management host, on receiving from the iSNS server a completion acknowledgement of the registration of the upper DD, adds a name of the upper DD and a name of the lower DD to the group management information in the memory portion.

3. A storage system as claimed in claim 2, wherein:

the processing portion of the management host, after mounting the memory area for use of the first storage device, obtains the name of the upper DD from the group management information based on the name of the memory area for use, and then notifies the iSNS server of the name of the upper DD;

the iSNS server deletes the upper DD based on the name of the upper DD and sends a completion acknowledgement of the deletion of the upper DD;

the first storage device deletes the mapping-setting of the name of the memory area for use and the name of the external memory area;

the processing portion of the management host notifies the iSNS server of the name of the lower DD;

the iSNS server deletes the lower DD; and the requesting host unmounts from the memory area for use of the first storage device.

4. A storage system as claimed in claim 3, wherein:

the group management information further includes token information for indicating whether or not a token for using the memory area for use has already been obtained; and the processing portion of the management host, on receiving a mount request from the requesting host, sends a token request to a management host existing in another site than the management host, and if a token is obtained in response to the token request, then sets to the token information a value indicating that the token has been obtained, to perform a mounting processing.

5. A storage system as claimed in claim 4, wherein the processing portion of the management host, on receiving a token request from the management host existing in the another site than the management host, sets to the token information a value indicating that a token has not been obtained.

6. A management host in a storage system having first and second storage devices; the management host for managing the first and second storage devices; a requesting host for making a request directed to a memory area for use of the first storage device; and an Internet storage name service (iSNS) server for managing a discovery domain (DD), and a network connecting among the storage devices, the server and the hosts, wherein:

the management host comprises a processing portion and a memory portion;

the memory portion of the management host stores group management information including a name of the memory area for use of the first storage device and a name of the external memory area physically configured in the second storage device, said memory area for use being a virtual memory area presented to the requesting host as configured in the first storage device while mapped to the external memory area;

the processing portion of the management host:

upon receiving a memory area configuration request from the requesting host, sends to the second storage device the memory area configuration request including the name of the external memory area;

upon receiving a completion acknowledgement of the memory area configuration request, sends to the iSNS server a lower DD registration request between the first and second storage devices;

upon receiving a completion acknowledgement of the lower DD registration request, sends a mapping-setting registration request to the first storage device;

upon receiving a completion acknowledgement of the mapping-setting registration request, sends to the iSNS server a upper DD registration request between the requesting host and the first storage device; and upon receiving from the iSNS server a completion acknowledgement of the upper DD registration request, sends to the requesting host the completion acknowledgement of the memory area configuration request including the name of the memory area for use.

7. A management host as claimed in claim 6, wherein the processing portion of the management host, upon receiving from the iSNS server the completion acknowledgement of the upper DD registration request, adds the name of the upper DD and the name of the lower DD to the group management information of the memory portion.

8. A management host as claimed in claim 7, wherein the processing portion of the management host:

upon receiving from the requesting host an unmount request including the name of the memory area for use in the first storage device, obtains the name of the upper DD from the group management information based on the name of the memory area for use, and then sends to the iSNS server an upper DD deletion request including the name of the upper DD;

upon receiving from the iSNS server a completion acknowledgement of the upper DD deletion request, sends to the first storage device a mapping-setting deletion request;

upon receiving from the first storage device a completion acknowledgement of the mapping-setting deletion request, sends an upper DD registration request to the iSNS server, and then sends to the iSNS server a lower DD deletion request including the name of the lower DD; and upon receiving from the iSNS server a completion acknowledgement of the lower DD deletion request, sends to the requesting host a completion acknowledgement of preparation of the unmount request.

9. A management host as claimed in claim 7, wherein:

the group management information further includes token information for indicating whether or not a token for using the memory area for use has already been obtained; and the processing portion of the management host, upon receiving a mount request from the requesting host, sends a token request to another management host existing in another site than the management host, and if a token is obtained in response to the token request, then sets to the token information a value indicating that the token has been obtained, to perform the mounting request for mounting the requesting host on the memory area for use of the first storage device thereby allowing the requesting host to manage the external memory area after the external storage area is configured.

10. A management host as claimed in claim 9, wherein the processing portion of the management host, upon receiving a token request from said another management host existing in the another site than the management host, sets to the token information a value indicating that a token has not been obtained.

11. A method for restricting storage access, performed by a storage system having first and second storage devices; a management host for managing the first and second storage devices; a requesting host for making a request directed to a memory area for use of the first storage device; and an Internet storage name service (iSNS) server for managing a discovery domain (DD), and a network connecting among the storage devices, the server and the hosts, the management host comprising a processing portion and a memory portion, said method including:

storing in the memory portion of the management host group management information including a name of a memory area for use of the first storage device and a name of an external memory area physically configured in the second storage device, said memory area for use being a virtual memory area presented to the requesting host as configured in the first storage device while mapped to the external memory area;

notifying by the management host the second storage device of the name of the external memory area, based on the name of the memory area for use;

configuring by the second storage device a memory area in the second storage device as the external memory area with the name of the external memory area notified from the management host;

registering by the iSNS server a lower DD between the first and second storage devices;

registering by the first storage device a mapping-setting of the name of the memory area for use and the name of the external memory area;

registering by the iSNS server a upper DD between the requesting host and the first storage device; and mounting the requesting host on the memory area for use of the first storage device and allowing the requesting host to manage the external memory area after the external storage area is configured.

12. A method for restricting storage access as claimed in claim 11, wherein the processing portion of the management host, upon receiving from the iSNS server a completion acknowledgement of registering the upper DD, adds the name of the upper DD and the name of the lower DD to the group management information of the memory portion.

13. A method for restricting storage access as claimed in claim 12, wherein:

the processing portion of the management host, after the requesting host mounting upon the memory area for use of the first storage device, obtains the name of the upper DD from the group management information based on the name of the memory area for use, and then notifies the iSNS server of the name of the upper DD;

the iSNS server deletes the upper DD based on the name of the upper DD and sends a completion acknowledgement of deleting the upper DD;

the first storage device deletes the mapping-setting of the name of the memory area for use and the name of the external memory area;

the processing portion of the management host notifies the iSNS server of the name of the lower DD;

the iSNS server deletes the lower DD; and the requesting host unmounts from the memory area for use of the first storage device.

14. A method for restricting storage access as claimed in claim 13, wherein:

the group management information further includes token information for indicating whether or not a token for using the memory area for use has already been obtained; and the processing portion of the management host, upon receiving a mount request from the requesting host, sends a token request to another management host existing in another site than the management host, and if a token is obtained in response to the token request, then sets to the token information a value indicating that the token has been obtained, to perform the mounting step.

15. A method for restricting storage access as claimed in claim 14, wherein the processing portion of the management host, upon receiving a token request from said another management host existing in the site other than the management host, sets to the token information a value indicating that a token has not been obtained.

16. A method for access restriction, the method performed by a management host in a storage system having first and second storage devices; the management host for managing the first and second storage devices; a requesting host for making a request directed to a memory area for use of the first storage device; and an Internet storage name service (iSNS) server for managing a discovery domain (DD), and a network connecting among the storage devices, the server and the hosts, the management host comprising a processing portion and a memory portion, said method including:

storing in the memory portion of the management host group management information including a name of a memory area for use of the first storage device and a name of an external memory area physically configured in the second storage device, said memory area for use being a virtual memory area presented to the requesting host as configured in the first storage device while mapped to the external memory area;

upon receiving a memory area configuration request from the requesting host, sending to the second storage device the memory area configuration request including the name of the external memory area;

upon receiving a completion acknowledgement of the memory area configuration request, sending to the iSNS server a lower DD registration request between the first and second storage devices;

upon receiving a completion acknowledgement of the lower DD registration request, sending a mapping-setting registration request to the first storage device;

upon receiving a completion acknowledgement of the mapping-setting registration request, sending to the iSNS server a upper DD registration request between the requesting host and the first storage device; and upon receiving from the iSNS server a completion acknowledgement of the upper DD registration request, sending to the requesting host the completion acknowledgement of the memory area configuration request including the name of the memory area for use.

17. A method for access restriction as claimed in claim 16, wherein the processing portion of the management host, upon receiving from the iSNS server the completion acknowledgement of the upper DD registration request, adds the name of the upper DD and the name of the lower DD to the group management information of the memory portion.

18. A method for access restriction as claimed in claim 17, wherein the processing portion of the management host:

upon receiving from the requesting host an unmount request including the name of the memory area for use in the first storage device, obtains the name of the upper DD from the group management information based on the name of the memory area for use, and then sends to the iSNS server an upper DD deletion request including the name of the upper DD;

upon receiving from the iSNS server a completion acknowledgement of the upper DD deletion request, sends to the first storage device a mapping-setting deletion request;

upon receiving from the first storage device a completion acknowledgement of the mapping-setting deletion request, sends an upper DD registration request to the iSNS server, and then sends to the iSNS server a lower DD deletion request including the name of the lower DD; and upon receiving from the iSNS server a completion acknowledgement of the lower DD deletion request, sends to the requesting host a completion acknowledgement of preparation of the unmount request.

19. A method for access restriction as claimed in claim 18, wherein:

the group management information further includes token information for indicating whether or not a token for using the memory area for use has already been obtained; and the processing portion of the management host, upon receiving a mount request from the requesting host, sends a token request to another management host existing in another site than the management host, and if a token is obtained in response to the token request, then sets to the token information a value indicating that the token has been obtained, to perform the mounting request for mounting the requesting host on the memory area for use of the first storage device thereby allowing the requesting host to manage the external memory area after the external storage area is configured.

20. A method for access restriction as claimed in claim 19, wherein the processing portion of the management host, upon receiving a token request from said another management host existing in the another site than the management host, sets to the token information a value indicating that a token has not been obtained.

21. A software program embedded in a computer readable storage medium and executable by a management host to restrict access in a storage system having first and second storage devices; the management host for managing the first and second storage devices; a requesting host for making a request directed to a memory area for use of the first storage device; and an Internet storage name service (iSNS) server for managing a discovery domain (DD), and a network connecting among the storage devices, the server and the hosts, said software program including:

a module for storing in the memory portion of the management host group management information including a name of a memory area for use of the first storage device and a name of an external memory area physically configured in the second storage device, said memory area for use being a virtual memory area presented to the requesting host as configured in the first storage device while mapped to the external memory area;

a module for, upon receiving a memory area configuration request from the requesting host, sending to the second storage device the memory area configuration request including the name of the external memory area;

a module for, upon receiving a completion acknowledgement of the memory area configuration request, sending to the iSNS server a lower DD registration request between the first and second storage devices;

a module for, upon receiving a completion acknowledgement of the lower DD registration request, sending a mapping-setting registration request to the first storage device;

a module for, upon receiving a completion acknowledgement of the mapping-setting registration request, sending to the iSNS server a upper DD registration request between the requesting host and the first storage device; and a module for, upon receiving from the iSNS server a completion acknowledgement of the upper DD registration request, sending to the requesting host the completion acknowledgement of the memory area configuration request including the name of the memory area for use.

* * * * *